Aug. 2, 1960  G. J. KIRCHNER ET AL  2,947,165
METHOD AND APPARATUS FOR TESTING PIPE
Filed Sept. 18, 1957  10 Sheets-Sheet 2

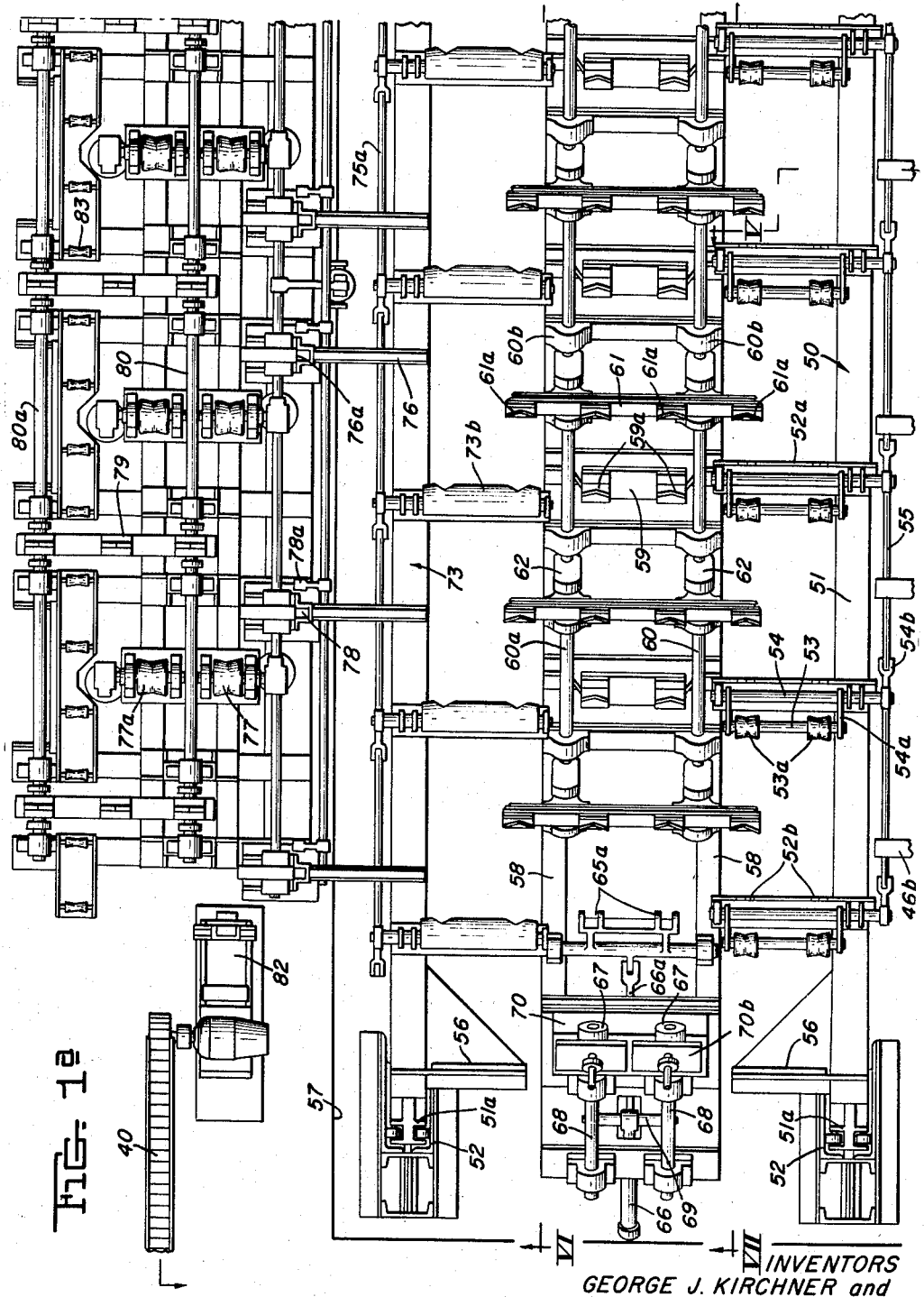

INVENTORS
GEORGE J. KIRCHNER and
ANDREW F. KRITSCHER
By: Donald G. Dalton
Attorney

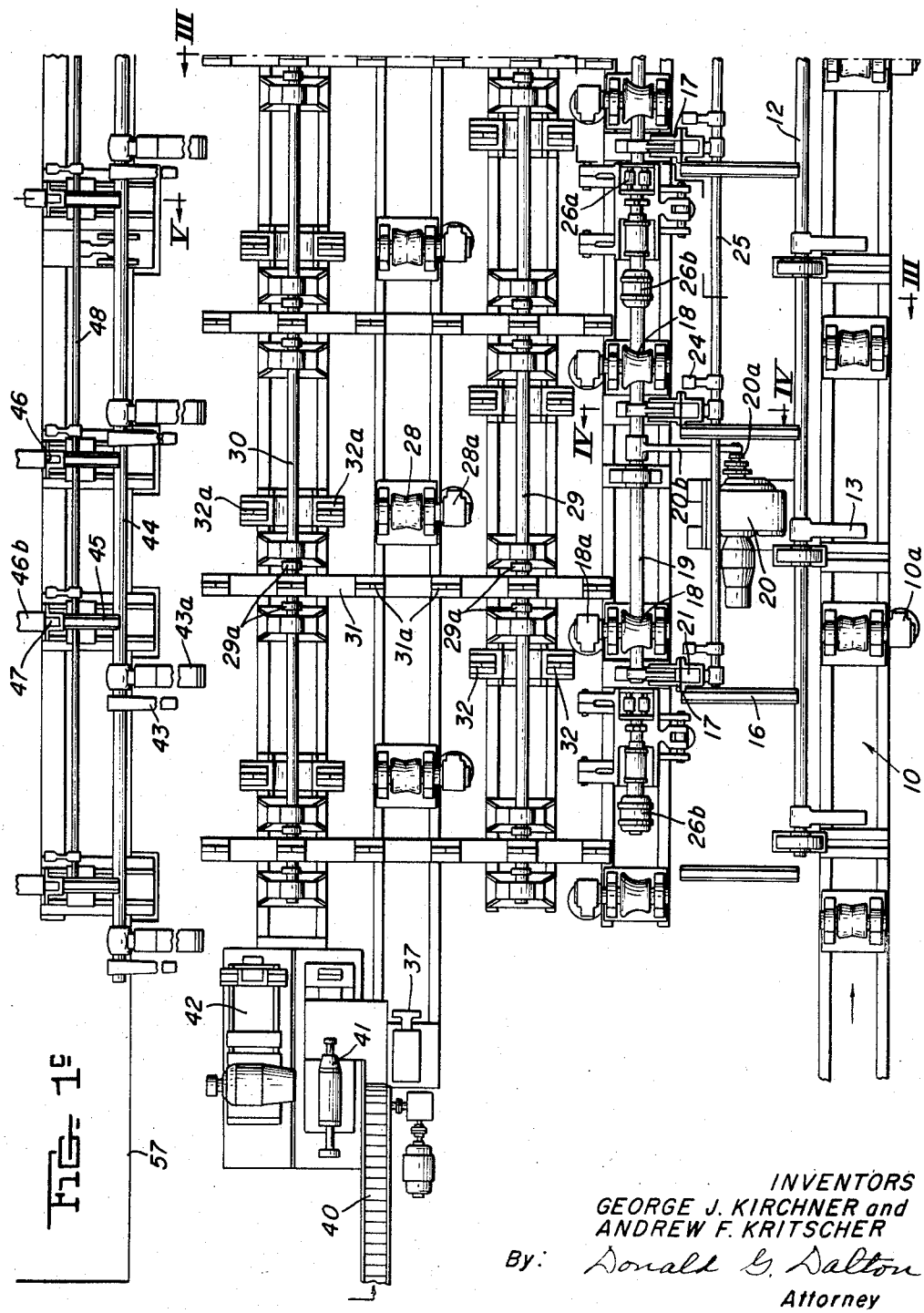

Aug. 2, 1960 G. J. KIRCHNER ET AL 2,947,165
METHOD AND APPARATUS FOR TESTING PIPE
Filed Sept. 18, 1957 10 Sheets-Sheet 4

INVENTORS
GEORGE J. KIRCHNER and
ANDREW F. KRITSCHER
By: Donald G. Dalton
Attorney

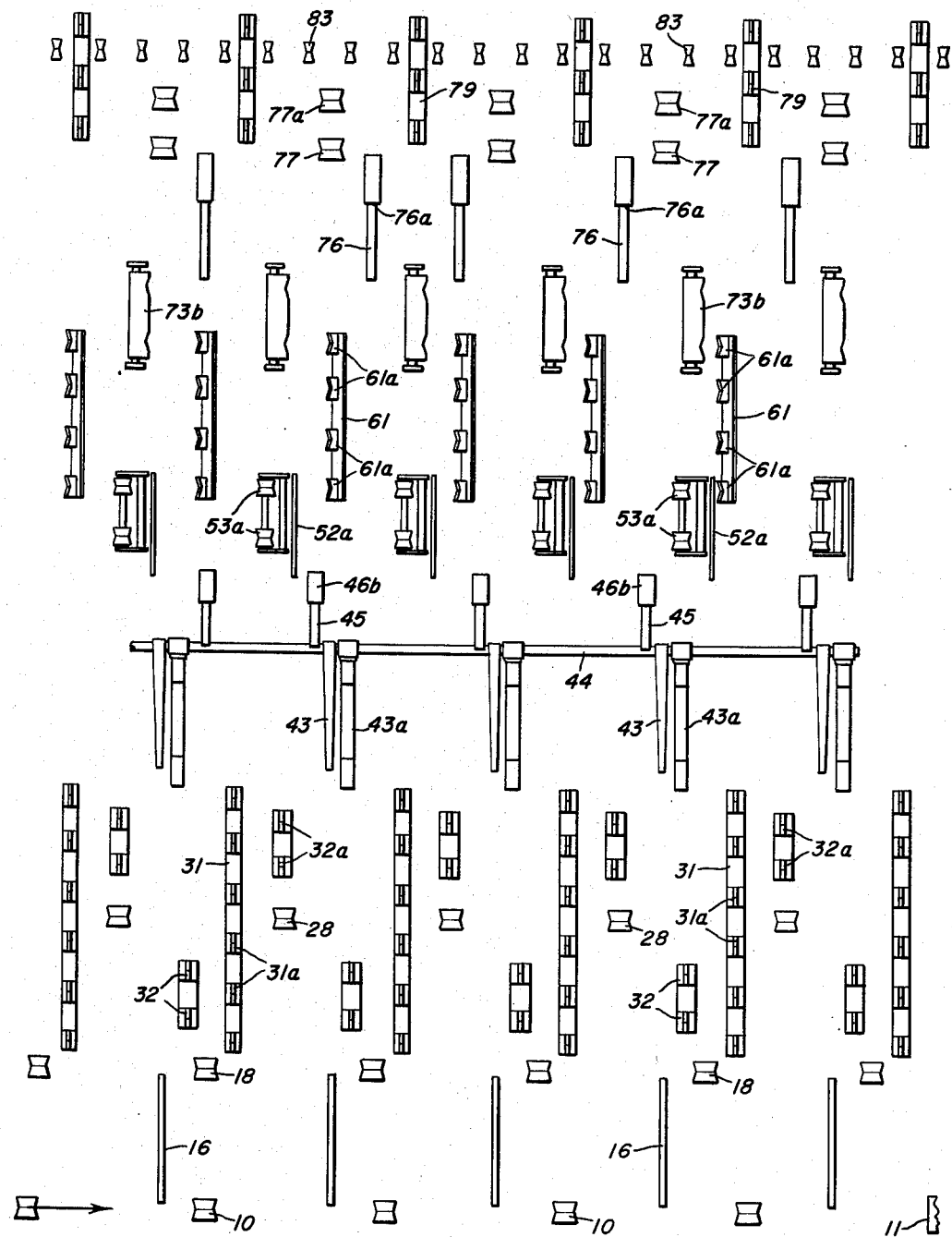

Aug. 2, 1960 G. J. KIRCHNER ET AL 2,947,165
METHOD AND APPARATUS FOR TESTING PIPE
Filed Sept. 18, 1957 10 Sheets-Sheet 6
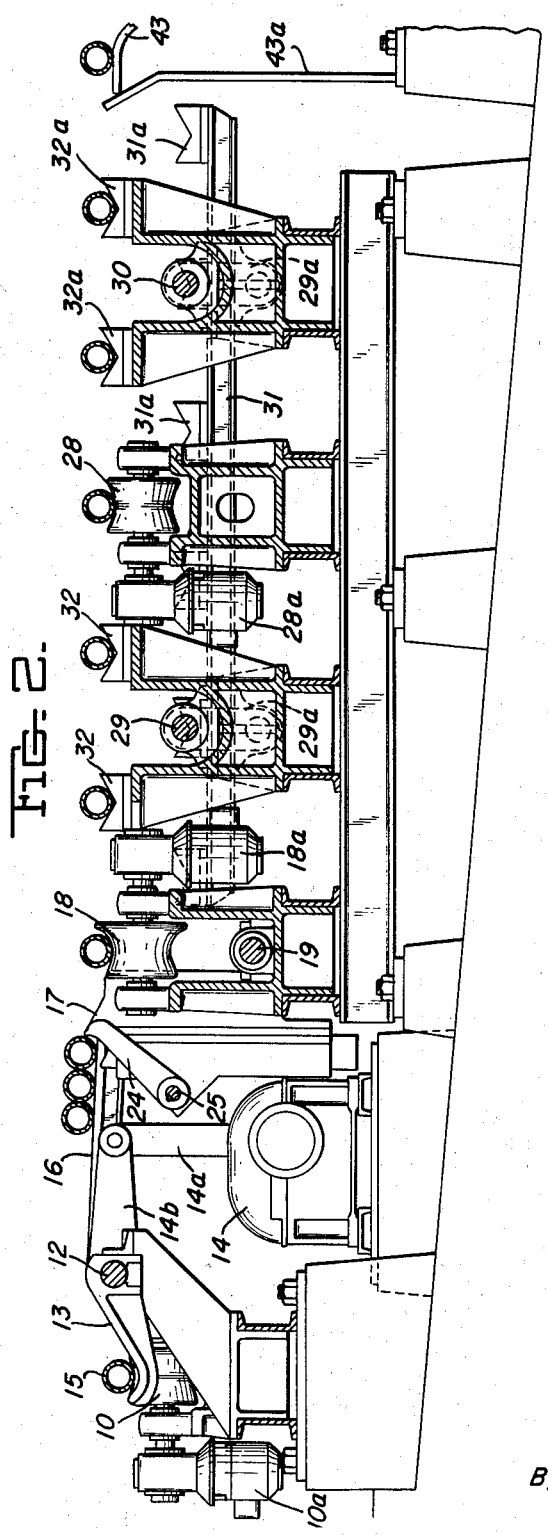
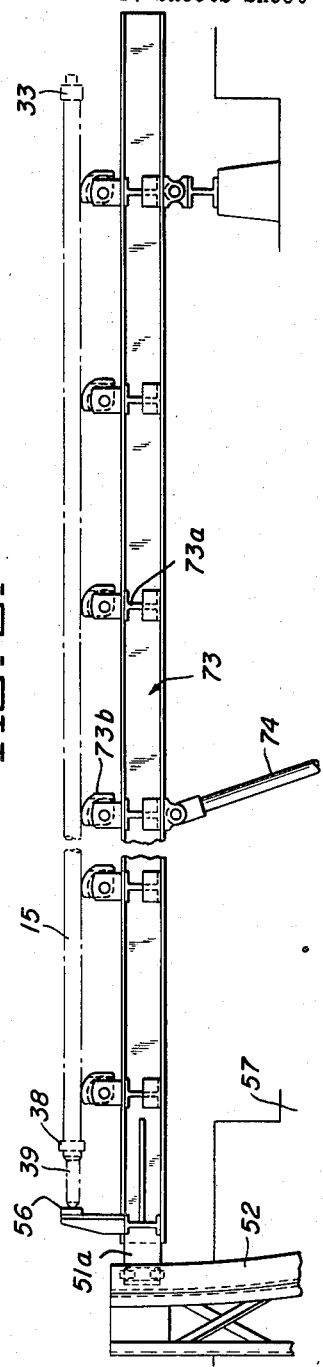
INVENTORS
GEORGE J. KIRCHNER and
ANDREW F. KRITSCHER
By: Donald G. Dalton
Attorney

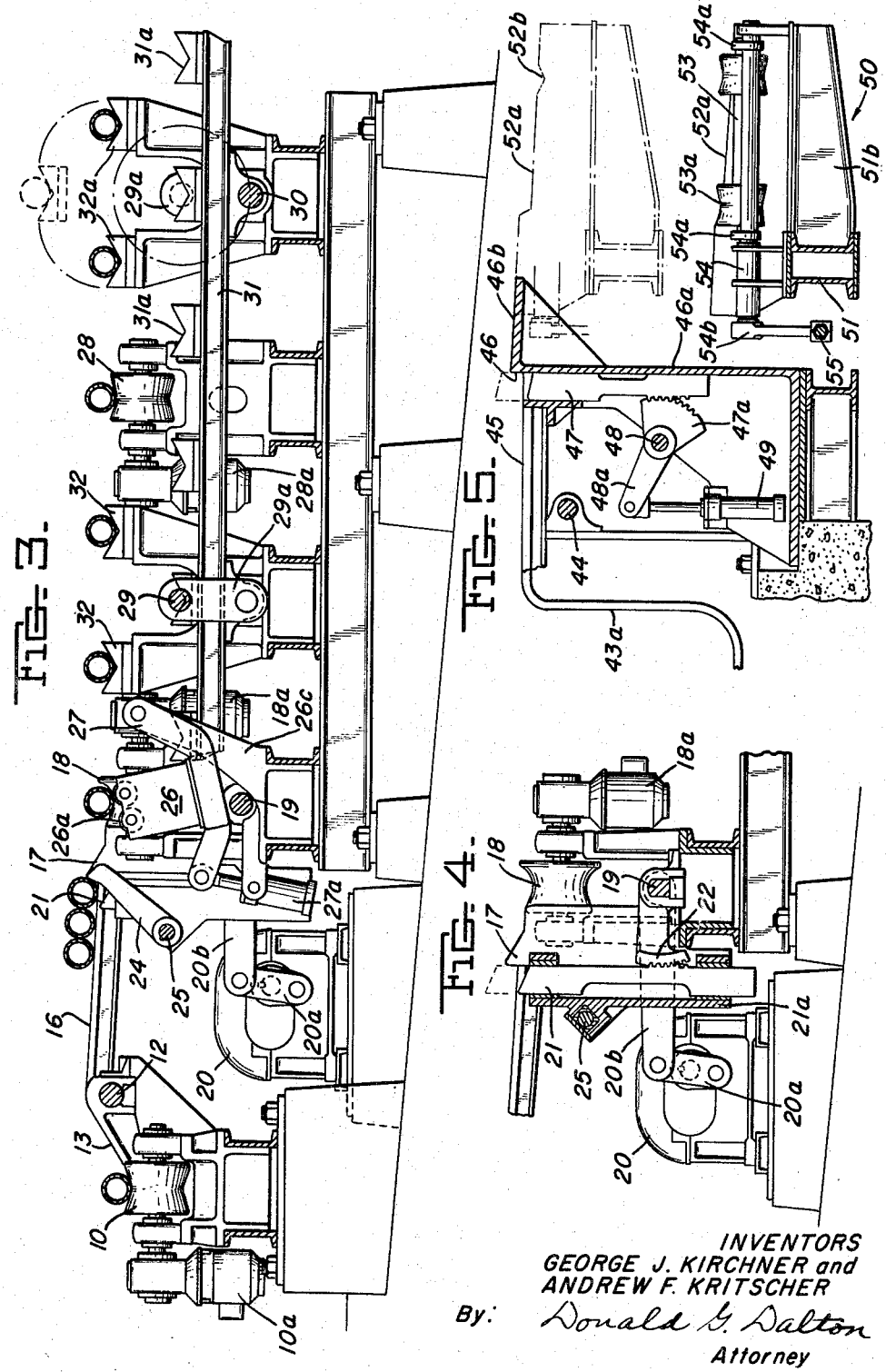

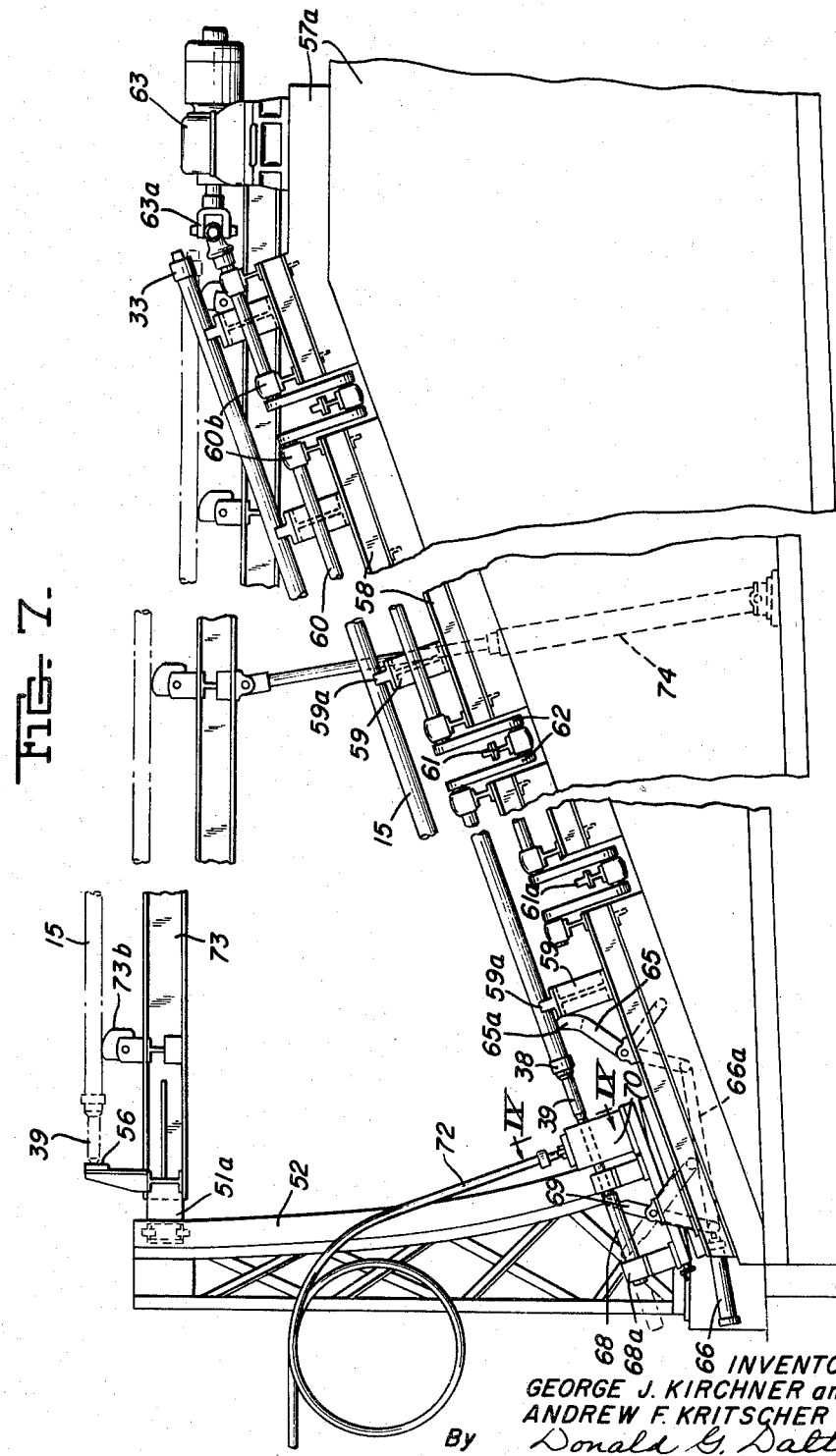

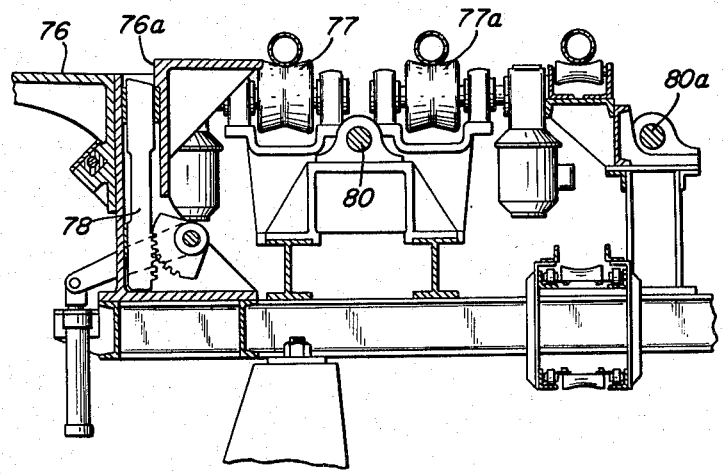
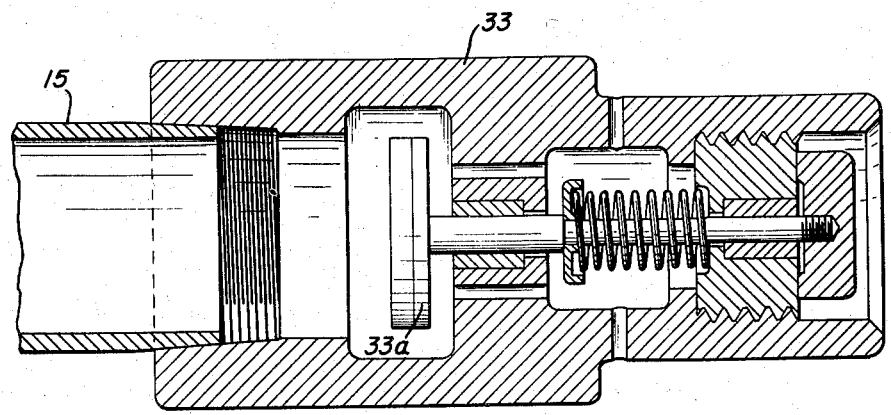

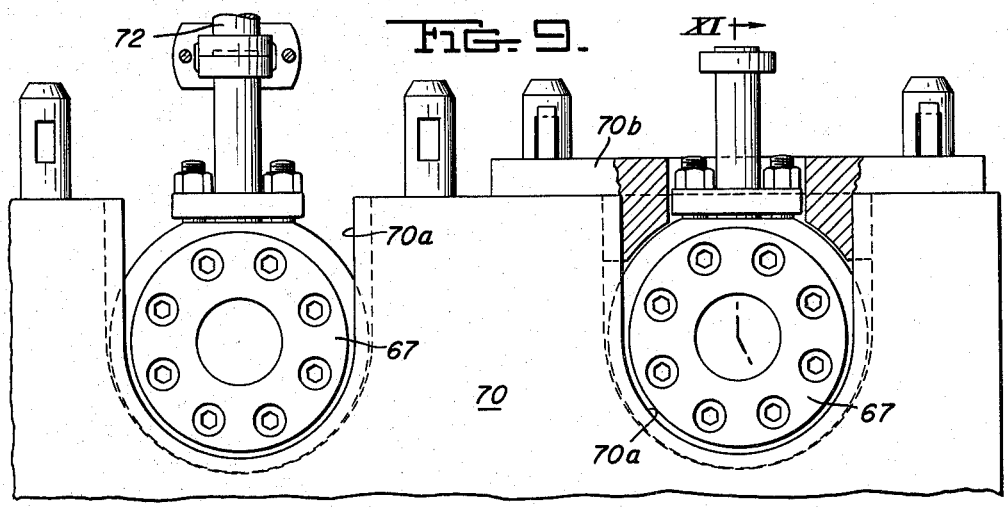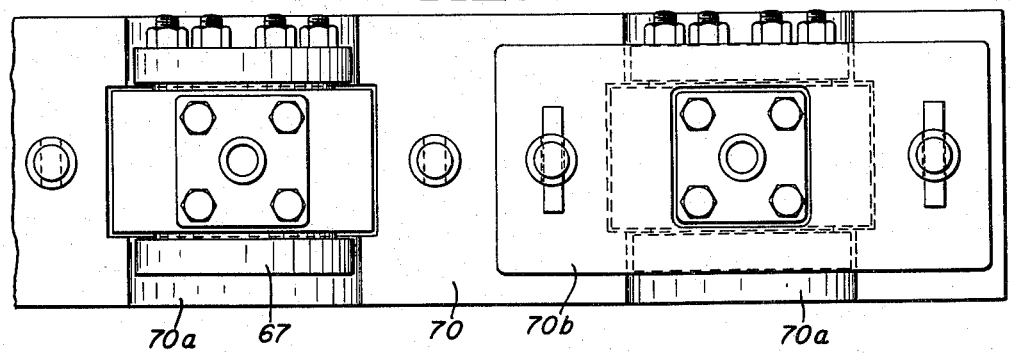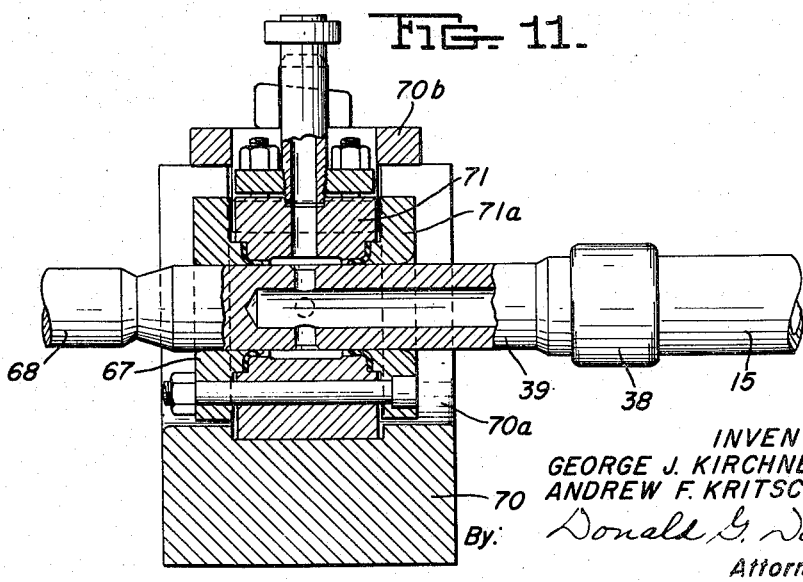

United States Patent Office 2,947,165
Patented Aug. 2, 1960

2,947,165

METHOD AND APPARATUS FOR TESTING PIPE

George J. Kirchner, Whitehall Borough, Pa., and Andrew F. Kritscher, Lafayette, Calif., assignors to United States Steel Corporation, a corporation of New Jersey Filed Sept. 18, 1957, Ser. No. 684,769

9 Claims. (Cl. 73—37)

This invention relates to the testing of lengths of metal pipe for resistance to internal pressure and, in particular to an improved method and apparatus for high-pressure testing.

Lengths of metal pipe are usually tested by subjecting them to internal hydraulic pressure. Certain products are tested under pressures up to 15,000 p.s.i., usually by the so-called field-testing method. In this method, a cap with an air-venting valve therein is screwed on one end of a pipe length and a pin or plug having a water inlet therethrough is screwed into a coupling on the other end of the length, the length being supported horizontally and unconfined longitudinally during the application of pressure. Considerable time is required for the water used as a test fluid to displace the air confined in the pipe through the venting valve. Complete displacement is not ordinarily effected, furthermore, because bubbles form at the top of the length and remain trapped at points distributed along the latter. As the hydraulic pressure builds up, the trapped air is compressed requiring the admission of more water under high pressure and this takes still further time. In case of the failure of a length under test, moreover, the presence of entrapped air, because of its expansibility, may cause a violent explosion instead of merely a restricted jet of escaping water which occurs when the failing pipe length is free from air.

We have invented a method and apparatus for testing pipe lengths which practically insures that all air will be displaced from the pipe before the full test pressure is applied. In accordance with our invention, we tilt the pipe lengths to an inclined position and introduce water into the lower end. This effects prompt and thorough purging of air through the venting valve at the other end as the liquid level rises through the length. The resulting improved purging of air reduces the amount of high-pressure water required for testing and the time needed to raise the pressure to the maximum value, as well as the possibility of violent explosion in case of failure. In a preferred embodiment, we provide a tilting table with pipe-supporting saddles and means to transfer lengths thereto while the table is horizontal. We then tilt the table downwardly at one end, transfer the lengths to an inclined test rack and establish connections for supplying water to the lower ends of the lengths. After completing the test and draining the water from the lengths, we transfer them to another tilting table, raise the table to horizontal and transfer the lengths therefrom.

A complete understanding of the invention may be obtained from the following detailed description and explanation which refer to the accompanying drawings illustrating the present preferred embodiment. In the drawings:

Figures 1a, 1b, 1c and 1d, when disposed, respectively, in the northwest, northeast, southwest and southeast quadrants about the intersection of north-south and east-west axes, constitute a plan view of the apparatus we prefer for carrying out our improved method;

Figure 2 is a partial transverse section taken along the planes of line II—II of Figure 1d;

Figures 3 and 4 are similar views taken along the planes of lines III—III and IV—IV of Figure 1c, respectively;

Figure 5 is a similar view taken along the planes of line V—V of Figures 1c and 1a;

Figures 6 and 7 are longitudinal elevations projected on the planes of lines VI—VI and VII—VII, respectively, of Figures 1a and 1b;

Figure 8 is a partial transverse section taken along the planes of line VIII—VIII of Figure 1b;

Figure 9 is an elevation of sockets or radial-connection boxes for receiving the plugs or pins screwed into couplings at one end of the pipe length;

Figure 10 is a plan view thereof with a part removed;

Figure 11 is a sectional view therethrough taken along the plane of line XI—XI of Figure 9; and Figure 12 is a longitudinal section through the valved cap screwed on the other end of the lengths.

Figure 1B:
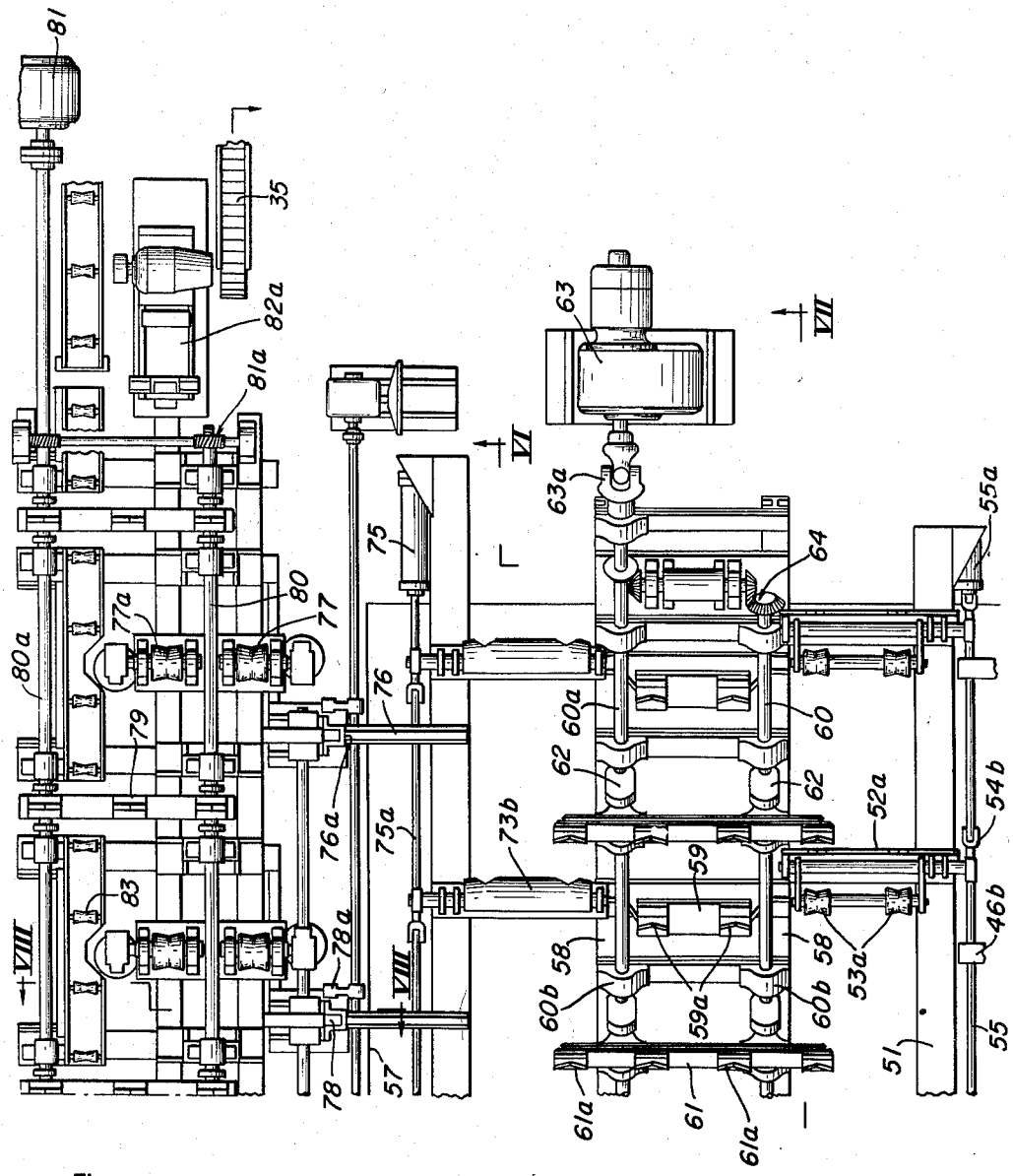
Figure 1e is a diagrammatic plan view of the apparatus of Figures 1a, 1b, 1c and 1d.
Figure 1D:
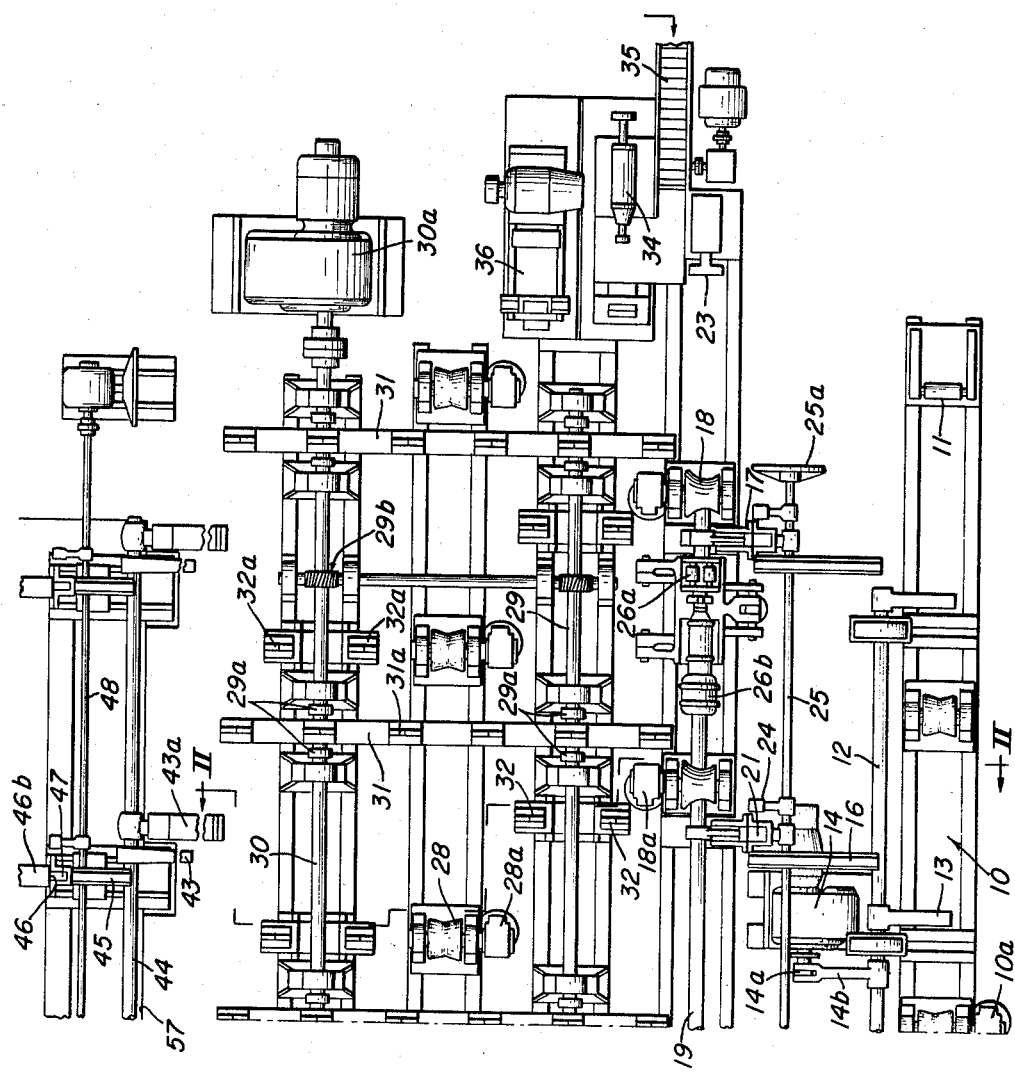

Referring now in detail to the drawings, and for the present, particularly to Figures 1c and 1d (except where otherwise noted) a run-in roller conveyor 10 feeds pipe lengths longitudinally in succession to a starting position with their leading end in contact with a stop 11. The rollers of conveyor 10 are driven by pendant motors 10a. A shaft 12 adjacent and parallel to the conveyor has pick-up arms 13 thereon adapted to be oscillated by a motor and gear-reducer unit 14 through a link 14a and crank 14b. When the shaft turns clockwise as viewed in Figure 2, the arms pick up a length 15 from conveyor 10 and deliver it sidewise to skids 16. Successive lengths rolling down skids 16 are halted by stops 17 (Figure 4) and a plurality of lengths may accumulate there as shown in Figure 2. The remainder of the apparatus will be described in the course of an explanation of the complete testing process.

Pipe lengths are fed individually from skids 16 to a positioning roller conveyor 18 (Figures 2–4), the rollers of which are driven by pendant motors 18a. A shaft 19 below the conveyor is oscillated by a motor-reducer unit 20 through a link 20a and a crank 20b (Figure 4). Pusher slides 21 reciprocable vertically in guides 21a have rack teeth thereon meshing with gear segments 22 on shaft 19. Therefore, on oscillation of shaft 19, slides 21 lift the lengths individually to a level above the stops 17 whereupon the lengths roll down onto the rollers of conveyor 18. These rollers are then operated to move each length longitudinally to the right until arrested by a stop 23 (Figure 1d). Stop arms 24 on a shaft 25 serve, if desired, to hold back the lengths accumulating on skids 16, out of engagement with slides 21. Shaft 25 may be turned by a hand wheel 25a (Figure 1d).

Lifting-roller boxes 26, spaced along conveyor 18, are carried by arms 27 pivoted on brackets 26c and are operable by fluid-pressure cylinders 27a. When fluid under pressure is admitted to the lower ends of the cylinders, the boxes are uptilted so their pairs of rollers 26a engage and raise the length from conveyor 18. This permits rotation of the length about its own axis to facilitate marking with a stripe. Rollers 26a are driven by motor 26b (Figure 1c) through suitable gearing (not shown). After the pipe has been marked, boxes 26 are lowered to replace the lengths on conveyor 18.

A second positioning conveyor 28 similar to conveyor 18 (except for boxes 26) is spaced therefrom and parallel thereto. The rollers of conveyor 28 are driven by pendant motors 28a. Transfer crank-shafts 29 and 30 are journaled on opposite sides of conveyor 28. The cranks 29a of these shafts (Figure 3) have transverse walking beams 31 pivoted thereto in spaced relation. Each beam has saddles 31a spaced therealong. Spaced pairs of fixed saddles 32 and 32a are mounted on the frame castings in which shafts 29 and 30, respectively, are journaled. The shafts are connected by a geared drive 29b so that their rotation is always synchronized. Shaft 30 is driven by a motor reducer 30a.

By virtue of the structure just described, the operation of motor reducer 30a causes the beams 31 on successive rotations of shafts 29 and 30 to pick up a pipe length from conveyor 18 and transfer it to the first set of the stationary saddles 32. In this location the length is positioned to have a cap such as shown at 33 in Figure 12, started thereon by a starter 34, to which caps are delivered by a conveyor 35. On the next rotation of shafts 29 and 30, the pipe length with a cap started thereon, is transferred to the second set of saddles 32, in line with a cap screw-up machine 36 which turns the cap tight on the threaded end of the length.

On the next rotation of shafts 29 and 30, beams 31 transfer the pipe length to conveyor 28 which is operated to move it to the left until it strikes a stop 37, positioning the length to receive at the left end an assembly of a coupling 38 and a plug or pin 39 as shown in Figure 11. Pre-assembled plugs and couplings are fed in by conveyor 40. An assembly is started on the end of the length when the latter is transferred by the next rotation of shafts 29 and 30 from conveyor 28 to the first set of saddles 32, by a starter 41. On the next step, i.e., when the length is deposited on the second set of saddles 32a, the plug and coupling are turned tight by screw-up machine 42. On the next oscillation of the walking beams, the pipe length is deposited on skids 43 (Figures 1c and 1d) spaced along a shaft 44, and rolls down onto skids 45 and against stops 46 (Figure 5). If either end closure on the length is observed to be defective, skids 43 are raised by turning shaft 44 and the length falls into a reject rack 43a.

It will be understood that, while the step-by-step travel of a single length has been described, the lengths follow each other in close-order succession, as shown in Figure 2, so that beams 31 normally lift and move six lengths on each oscillation, stepping each length successively from one position to the next.

Lengths are successively raised above stops 46 by slides 47 (Figure 5) reciprocable in frame castings 46a and operated by segment gears 47a on a rock shaft 48. Shaft 48 is rocked by a fluid-pressure cylinder 49 connected to a crank 48a on the shaft. A roller table 50 is tiltably mounted at the discharge side of skid extensions 46b on frame castings 46a. Table 50 comprises a beam 51 pivoted to a fixed support at one end and having a roller head 51a at the other end traveling in arcuate guides 52. Figures 6 and 7 show in elevation a tilting table similar but not identical to table 50. Beam 51 has cantilever arms 51b extending laterally therefrom, supporting sloping skids 52a. Roller shafts 53 having rollers 53a thereon are journalled in cranks 54a on shafts 54. Additional cranks 54b at the ends of shafts 54 are pivoted to a push rod 55. A fluid-pressure cylinder 55a (Figure 1b) has its piston connected to the push rod.

Before loading lengths on table 50, push rod 55 is actuated to bring rollers 53a below the level of the upper edges of skids 52a. Thus the first of a pair of lengths discharged by slides 47 when table 50 is horizontal (as shown in chain lines in Figure 5), rolls down the skids and stops in notches 52b in the skids. Push rod 55 is then actuated to the left to raise rollers 53a to the position shown in solid lines in Figure 5. The next length fed forward from skids 45 therefore stops on the first set of rollers 53a. When two lengths have thus been deposited on the rollers 53a of table 50, the latter is tilted downwardly at the left end, by a fluid-pressure cylinder, to an angle of about 20° with the horizontal. The lengths thereupon roll down against a stop plate 56 on table 50.

Referring more particularly now to Figures 1a, 1b and 7, a test pit 57 has an inclined foundation 57a built up therein, spaced from the sides thereof. Interrupted H-beams 58 are laid on the foundation, and transverse saddle beams 59 having pairs of magnetic saddles 59a thereon are secured to the H-beams. Crank shafts 60 and 60a are journaled in bearings 60b mounted on beams 58. Shuffle bars or saddle beams 61 having magnetic saddles 61a thereon are carried by cranks 62 on the shafts. Shaft 60a is driven by a motor-reducer 63 through a universal joint 63a and the shafts are connected by a geared shaft drive 64. On the first rotation of shafts 60 and 60a, they pick up a pair of lengths from rollers 53a and transfer them to saddles 59a. The position of the lengths thereafter is as shown in Figure 7.

When a pair of lengths has been transferred from rollers 53a to saddles 59a, a forked actuator 65 pivoted transversely of beams 58, is actuated counterclockwise as viewed in Figure 7 by a fluid-pressure cylinder 66 pivotally mounted between the beams. A link 66a is pivoted to the piston rod of the cylinder 66 and to a crank arm or actuator 65. Bifurcated ends 65a on the actuator engage behind couplings 38 on the lengths and push pins or plugs 39 into sealing boxes or sockets 67 (Figures 9–11), and against ejector plungers 68. Plungers 68 are slidable in guides 68a and are operated by cylinder 66 through a lever 69 pivoted to link 66a and to the plungers.

Referring now to Figures 9–11, a block 70 has notches 70a in the top thereof. Boxes 67 are confined loosely in notches 70a by keepers 70b bridging the notches and keyed to block 70. Each box comprises a bushing 71 seated in a groove in notch 70a, with flanges 71a through-bolted to opposite ends and clamping sealing cup leathers thereto. The bushing and flanges are bored to receive pins 39. The pins are drilled axially and both the bushing and pins have radial passages whereby test fluid supplied through a flexible connection 72 secured to bushing 71, is admitted to the interior of the pipe length.

The lengths being in inclined position when filled with water from below, are thoroughly purged of air as the water level rises therein. The air escapes through vent valve 33a in cap 33. When the lengths have been filled full of water, the pressure thereof closes valve 33a and the test pressure may then be increased to the desired value. When the pressure testing of the length has been completed, cylinder 66 is operated to actuate the ejector plungers 68, thereby pushing plugs 39 out of boxes 67. On releasing the water pressure, the valve 33a immediately reopens because of its spring loading to permit quick drainage of test water from the length through plugs 39. Shafts 60 and 60a are then operated to transfer the lengths from saddles 59a to a tilting table 73 (Figure 6) which is in its lowermost position. Table 73 is similar to table 50 except that its cantilever arms 73a have supports 73b pivoted thereto. These supports have grooved and sloping plain surfaces. The table is raised and lowered by a fluid-pressure cylinder 74. Supports 73b are tiltable by a cylinder 75 and push rod 75a from a position in which their grooved surfaces are uppermost to a position in which their plain surfaces are uppermost. They are in the former position when pipe lengths are deposited thereon. Thus when tilted to bring their plain surfaces uppermost, the lengths thereon roll down onto skids 76, until arrested by stops 76a (Figure 8).

Lengths are discharged individually onto a roller conveyor 77 by slides 78 through a rack and segment gear similar to that shown in Figure 5. Movable stops 78a prevent the feeding of more than one length at a time. The lengths are then transferred from conveyor 77 to a second similar conveyor 77a by oscillating shuffle bars 79, similar to bars 61. The rollers of conveyors 77 and 77a are driven by pendant motors. Bars 79 are carried by cranks on parallel shafts 80 and 80a driven by a motor-reducer 81 and connected by gearing 81a. While on conveyor 77, each length is moved to the left and its plug 39 is unscrewed by an unscrewing machine 82, for return by conveyor 40. Similarly when each length is on conveyor 77a it is moved to the right so its cap 33 can be unscrewed by an unscrewing machine 82a for return by conveyor 35.

Shuffle bars 79 then transfer lengths successively from conveyor 77a to a roller conveyor 83 for the passage therethrough of a drift mandrel actuated by air pressure. Bars 79 then transfer the lengths from conveyor 83 to other conveyors and skids (not shown) where they are subjected to any desired further finishing operations.

Although we have disclosed herein the preferred embodiment of our invention, we intend to cover as well any change or modification therein which may be made without departing from the spirit and scope of the invention.

We claim:

1. A method of testing a pipe length which consists in advancing the length sidewise along a generally horizontal plane and, while so advancing it, applying a valved cap to one end thereof and a coupling having a projecting pin screwed therein to the other end, tilting the length from the horizontal position so that said pin is lower than said cap, filling said length with liquid under pressure through said pin, then draining the fluid from the length, returning it to horizontal position and removing the cap and pin.

2. A method of testing a pipe length which consists in advancing the length sidewise along a generally horizontal plane and, while so advancing it, applying a valved cap to one end thereof and a coupling having a projecting pin screwed therein to the other end, moving the length sidewise in substantially horizontal position onto a horizontal support, tilting the support to bring the pin lower than the cap, transferring the length to an inclined support, filling the length with liquid under pressure, draining the liquid, transferring the length to an inclined support and tilting the latter to restore the length substantially to horizontal position.

3. A method as described in claim 1, characterized by stabbing the pin into a connection socket after tilting the length and ejecting it therefrom after filling the length with liquid.

4. In a pipe-testing apparatus, the combination with means for advancing pipe lengths sidewise along a generally horizontal plane, an inclined support for pipe lengths between the entrance and exit of said means, said support having a connection box at the lower end, of entrance and exit tables tiltable about one end on opposite sides of said support, adapted when in horizontal position to receive lengths from and deliver lengths to said means, respectively, and means for transferring lengths from the entrance table to the support and from the support to the exit table.

5. Apparatus as described in claim 4, characterized by said entrance table having pairs of rolls spaced therealong and a sloping skid adjacent each pair of rolls, and means operable selectively to bring either the skids or the rolls above the others.

6. Apparatus as described in claim 4, characterized by said exit table having sloping skids spaced therealong, each skid having a plain surface and a notched surface, and common means for turning the skids to bring either the plain surfaces or the notched surfaces above the others.

7. Apparatus as described in claim 4, characterized by means for causing a pin on the lower end of a length on the support to stab said box.

8. Apparatus as described in claim 4, characterized by an ejector adjacent said box adapted to push therefrom a pin on a length carried on the support which has been stabbed thereinto.

9. Apparatus as described in claim 4, characterized by said tables being pivoted adjacent one end and an arucate guide track cooperating with their other end.

References Cited in the file of this patent
UNITED STATES PATENTS

| | | |
|---|---|---|
| 527,200 | Hall | Oct. 9, 1894 |
| 580,685 | Hall | Apr. 13, 1897 |
| 716,217 | Glenn | Dec. 16, 1902 |
| 856,074 | Lockhart | June 4, 1907 |
| 2,532,954 | Sherer et al. | Dec. 5, 1950 |
| 2,558,208 | Cormany | June 26, 1951 |
| 2,565,460 | Woodlief | Aug. 21, 1951 |
| 2,633,739 | Potts et al. | Apr. 7, 1953 |